(12) United States Patent
Sobti et al.

(10) Patent No.: US 10,790,272 B2
(45) Date of Patent: Sep. 29, 2020

(54) MANUFACTURABILITY (DFM) CELLS IN EXTREME ULTRA VIOLET (EUV) TECHNOLOGY

(71) Applicant: QUALCOMM Incorporated, San Diego, CA (US)

(72) Inventors: Harmeet Sobti, San Diego, CA (US); Mehrdad Manesh, San Diego, CA (US); Li-Fu Chang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/049,726

(22) Filed: Jul. 30, 2018

(65) Prior Publication Data

US 2019/0043850 A1 Feb. 7, 2019

Related U.S. Application Data

(60) Provisional application No. 62/540,329, filed on Aug. 2, 2017.

(51) Int. Cl.
*H01L 27/02* (2006.01)
*G06F 30/39* (2020.01)
(Continued)

(52) U.S. Cl.
CPC .......... *H01L 27/0207* (2013.01); *G06F 30/39* (2020.01); *G06F 30/398* (2020.01); *H01L 21/823878* (2013.01); *H01L 23/528* (2013.01); *H01L 23/5226* (2013.01); *H01L 23/53209* (2013.01); *H01L 23/53228* (2013.01); *H01L 23/53257* (2013.01); *H01L 27/092* (2013.01); *H03K 19/0948* (2013.01); *H03K 19/20* (2013.01); *H03K 19/215* (2013.01); *G06F 2119/18* (2020.01); *H01L 21/823814* (2013.01); *H01L 21/823871* (2013.01); *H01L 2027/11875* (2013.01)

(58) Field of Classification Search
CPC combination set(s) only.
See application file for complete search history.

(56) References Cited

U.S. PATENT DOCUMENTS 7,446,352 B2 11/2008 Becker et al.
7,535,063 B2 5/2009 Kao
(Continued)

FOREIGN PATENT DOCUMENTS

WO 2017111924 A1 6/2017

OTHER PUBLICATIONS

International Search Report and Written Opinion—PCT/US2018/044699—ISA/EPO—Oct. 25, 2018.
(Continued)

*Primary Examiner* — Nduka E Ojeh
(74) *Attorney, Agent, or Firm* — Loza & Loza, LLP/Qualcomm

(57) ABSTRACT

Aspects of the disclosure are directed to a circuit. In accordance with one aspect, the circuit includes a first layer, wherein the first layer includes two-dimensional (2D) shapes; a second layer coupled adjacent to the first layer through at least one via hole, wherein the second layer includes only one-dimensional (1D) shapes; a shared drain terminal; and a source terminal termination.

28 Claims, 5 Drawing Sheets

(51) Int. Cl.
*G06F 30/398* (2020.01)
*H01L 21/8238* (2006.01)
*H01L 23/522* (2006.01)
*H01L 23/528* (2006.01)
*H01L 23/532* (2006.01)
*H01L 27/092* (2006.01)
*H03K 19/0948* (2006.01)
*H03K 19/20* (2006.01)
*H03K 19/21* (2006.01)
*H01L 27/118* (2006.01)
*G06F 119/18* (2020.01)

(56) References Cited

U.S. PATENT DOCUMENTS 8,455,955 B2 6/2013 Stribley et al.
8,759,872 B2 6/2014 Arghavani et al.
8,863,063 B2* 10/2014 Becker .................. H01L 27/092 716/118
8,969,967 B2 3/2015 Noel et al.
9,368,496 B1 6/2016 Yu et al.
9,741,661 B2 8/2017 Azmat et al.
9,831,272 B2 11/2017 Chen et al.
2002/0163048 A1* 11/2002 Cebenko ........... H01L 27/11807 257/401
2005/0269706 A1* 12/2005 Tan ....................... H01L 23/485 257/758
2008/0176378 A1 7/2008 Batra et al.
2009/0315080 A1* 12/2009 Stribley .............. H01L 27/0203 257/208
2010/0187633 A1* 7/2010 Becker ................ H01L 27/1104 257/369
2013/0313615 A1 11/2013 Tzeng et al.
2014/0206111 A1* 7/2014 Tanaka ................ H01L 21/0274 438/16
2014/0353842 A1 12/2014 Yuan et al.
2015/0054089 A1 2/2015 Hong et al.
2015/0221639 A1 8/2015 Chen et al.
2015/0333008 A1* 11/2015 Gupta ................. H01L 27/0207 257/369
2016/0013206 A1 1/2016 Vinet et al.
2016/0056083 A1 2/2016 Do et al.
2016/0071848 A1 3/2016 Sengupta et al.
2016/0336183 A1 11/2016 Yuan et al.
2017/0025412 A1* 1/2017 Jun ................... H01L 21/82348

OTHER PUBLICATIONS

Vaidyanathan K., et al., "Sub-20 nm Design Technology Cooptimization for Standard Cell Logic", Computer-Aided Design, IEEE Press, Piscataway, NJ, USA, Nov. 3, 2014 (Nov. 3, 2014), XP058062248, pp. 124-131.

* cited by examiner

MANUFACTURABILITY (DFM) CELLS IN EXTREME ULTRA VIOLET (EUV) TECHNOLOGY

CROSS-REFERENCE TO RELATED APPLICATION(S)

This application claims priority to and the benefit of U.S. Provisional Patent Application No. 62/540,329, filed on Aug. 2, 2017, the entire content of which is incorporated herein by reference as if fully set forth below in its entirety and for all applicable purposes.

TECHNICAL FIELD

This disclosure relates generally to the field of integrated circuits, and, in particular to nano-meter scale integrated circuits.

BACKGROUND

Increased functionality of integrated circuits (ICs) may be facilitated by finer feature sizes (i.e., smaller circuit dimensions) which may require advanced lithographic techniques for implementation. With smaller feature sizes, devices may be made smaller or more functionality may be incorporated in the same physical volume. However, with smaller feature sizes, production yield may degrade with a negative economic impact. Thus IC designs with reasonable production yields and smaller feature size are desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a circuit. Accordingly, the circuit, includes a first layer, wherein the first layer includes two-dimensional (2D) shapes; a second layer coupled adjacent to the first layer through at least one via hole, wherein the second layer includes only one-dimensional (1D) shapes; a shared drain terminal; and a source terminal termination.

In one example, the circuit further includes a plurality of MOS transistors, wherein at least two of the plurality of MOS transistors are associated with the shared drain terminal. In one example, at least one of the plurality of MOS transistors is associated with the source terminal termination. In one example, the plurality of MOS transistors includes at least one NMOS transistor. In one example, the plurality of MOS transistors includes at least one PMOS transistor. In one example, the plurality of MOS transistors includes at least one PMOS transistor.

In one example, the first layer is a metal routing layer. In one example, the metal routing layer is a copper layer. In one example, the second layer is an interface layer made of cobalt or tungsten. In one example, the second layer is a local interconnect layer. In one example, the circuit is a design for manufacturability (DFM) cell based on extreme ultraviolet (EUV) technology. In one example, the circuit is one of the following: a NAND gate, a NOR gate, an AND gate, a OR gate or an XOR gate. In one example, the circuit is a two-input NAND gate. In one example, the circuit is a two-input NOR gate.

Another aspect of the disclosure provides a method for fabricating an integrated circuit, the method including configuring a first layer of the integrated circuit, wherein the first layer includes at least one two-dimensional (2D) shape; configuring a second layer of the integrated circuit adjacent to the first layer, wherein the second layer includes only one-dimensional (1D) shapes; and configuring a shared drain terminal between two transistors in the integrated circuit, wherein a portion of the shared drain terminal resides within the second layer.

In one example, the method further includes configuring a source terminal termination for the two transistors in the integrated circuit, wherein a portion of the source terminal termination resides within the second layer. In one example, the method further includes configuring the two transistors onto the integrated circuit. In one example, the method of further includes assembling the first layer, the second layer, the shared drain terminal and the source terminal termination as the design for manufacturability (DFM) circuit. In one example, the first layer includes at least one one-dimensional (1D) shape. In one example, the first layer is a metal routing layer. In one example, the metal routing layer is a copper layer. In one example, configuring the first layer is based in part on extreme ultraviolet (EUV) technology. In one example, the second layer is coupled adjacent to the first layer through at least one via hole. In one example, the second layer is an interface layer made of cobalt or tungsten. In one example, configuring the second layer is based in part on extreme ultraviolet (EUV) technology.

Another aspect of the disclosure provides an apparatus for fabricating an integrated circuit, the apparatus including means for configuring a first layer of the integrated circuit, wherein the first layer includes at least one two-dimensional (2D) shape; means for configuring a second layer of the integrated circuit adjacent to the first layer, wherein the second layer includes only one-dimensional (1D) shapes; means for configuring a shared drain terminal between two transistors in the integrated circuit, wherein a portion of the shared drain terminal resides within the second layer; means for configuring a source terminal termination for the two transistors in the integrated circuit, wherein a portion of the source terminal termination resides within the second layer; and means for configuring the two transistors onto the integrated circuit.

Another aspect of the disclosure provides a method for fabricating an integrated circuit, the method including configuring at least two transistors onto the integrated circuit; configuring a shallow trench isolation (STI) for the at least two transistors; configuring a first layer of the integrated circuit, wherein the first layer includes only one-dimensional (1D) shapes; and configuring a second layer of the integrated circuit, wherein the second layer includes at least one two-dimensional (2D) shape. In one example, the first layer is adjacent to the second layer. In one example, the first layer is a contact merge (CM) layer made of cobalt or tungsten. In one example, the second layer is a metal layer made of copper. In one example, the at least two transistors are either two negative channel metal oxide semiconductor (NMOS) transistors or two positive channel metal oxide semiconductor (PMOS) transistors, and wherein the at least two transistors include a shared drain terminal.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure may include one or more of the advantageous features discussed herein. In other words, while one or more implementations may be discussed as having certain advantageous features, one or more of such features may also be used in accordance with the various implementations of the present disclosure discussed herein. In similar fashion, while exemplary implementations may be discussed below as device, system, or method implementations it should be understood that such exemplary implementations may be implemented in various devices, systems, and methods.

DETAILED DESCRIPTION

Figure 1:
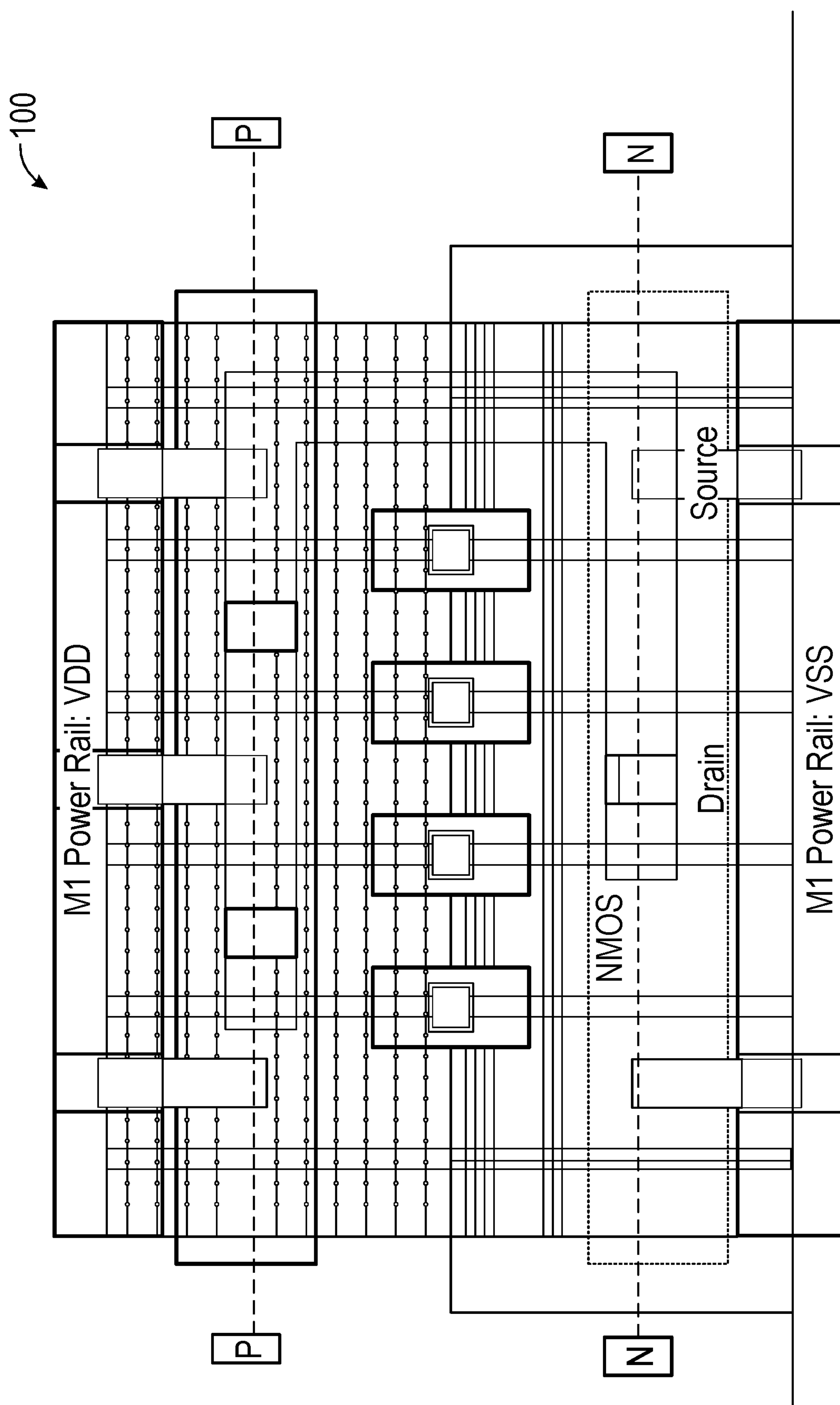
FIG. 1 illustrates an example of a circuit in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Integrated circuits are comprised of a plurality of circuits which serve as building blocks to implement complex electronics functionality. For example, a circuit may include a group of transistors and interconnections which implements a logic function, a storage function or a combination of both functions. In one example, logic functions include Boolean logic functions such as AND gate, OR gate, XOR gate, NAND gate, NOR gate or any other logic gate using same principles. The logic functions may also be two-input logic functions, such as a two-input NAND gate (NAND2), a two-input NOR gate (NOR2), etc. Although two-input NAND gates and two-input NOR gates are disclosed here, the present disclosure does not exclude other types of two-input logic functions or other multiple-input logic functions. In one example, storage functions may include a latch, flip flop (FF), memory cell, etc. as part of the implementation of the present disclosure. A concatenated assembly of circuits may implement a variety of applications such as a microprocessor, a random-access memory (RAM), input/output (I/O) devices, a ring oscillator (RO), etc. One skilled in the art would understand that other varieties of applications beyond those mentioned herein are also within the scope and spirit of the present disclosure.

The general trend of increased functionality of integrated circuits is facilitated by the decreasing feature size of electronic components on the circuits. In one aspect, a feature size is the smallest dimension of an electronic component. Feature sizes have diminished from approximately 10 micrometers (i.e. $10^{-5}$ m) when integrated circuits first appeared in the 1970s to approximately 10 nanometers (i.e. $10^{-8}$ m) and lower today. Attaining these nanoscale dimensions may require advanced lithographic techniques such as extreme ultraviolet (EUV) lithography (a.k.a. EUV technology). In one example, lithography is a patterning process used in integrated circuit fabrication which defines the circuit density of the integrated circuit. In one aspect EUV lithography exploits the very fine resolution of EUV radiation with an electromagnetic wavelength on the order of 10 nm, commensurate with current desired feature sizes. Integrated circuits such as circuits fabricated with EUV lithography may be referred to as "circuits for EUV technology". For example, EUV lithography provides finer pattern definition and fidelity and allows design flexibility and smaller circuit features. In general, one metric of the performance of integrated circuit technology is the fabrication yield, that is, the percentage of manufactured devices which are suitable for end user application. Attaining a high fabrication yield involves a tradeoff between increased circuit complexity and ease of manufacturability.

In one example, circuits for EUV technology may be used to implement complex electronics functionality. In accordance with the present disclosure, layout properties may be optimized for the circuits and their corresponding fabrication yield may be improved. The present disclosure discloses circuits for EUV technology which have higher fabrication yield, improved properties in layout, reduced power consumption, performance, reduced area (reduced footprint), etc. That is, in the present disclosure, the circuits for EUV technology are circuits with Design for Manufacturability (DFM) for integrated circuit designs.

In one example, circuits may include both one-dimensional (1D) shapes and two-dimensional (2D) shapes. For example, 1D shapes are geometric shapes which have a predominant dimensionality in one linear direction. For example, 2D shapes are geometric shapes which have a predominant dimensionality in two orthogonal directions.

For example, a circuit for EUV technology may include a plurality of layers (i.e., a planar structure). In one example, the circuit may be made of a plurality of layers in a vertical direction with edge layers and interface layers. For example, an edge layer is a planar structure in a circuit which is adjacent to another layer (e.g. interface layer) on a first plane and which is not adjacent to another layer on a second plane. In one example, the first plane and the second plane are on opposite sides of the planar structure. For example, an interface layer is a different planar structure in a circuit which is adjacent to another layer on a third plane and adjacent to a different layer on a fourth plane. In one example, the third plane and the fourth plane are on opposite sides of the different planar structure.

In one example, two-dimensional (2D) routing may be used on a first layer, for example, a metal layer (M1 layer), based on copper. In one example, 2D routing is routing using 2D shapes. In one example, the first layer may be an interface layer. In one example, the first layer may be an edge layer.

In addition, the circuit may include a second layer. In one example, the second layer may be an interface layer. In one example, the second layer may be an edge layer. In one example, the interface layer is a contact merge (CM) layer. The CM layer may be based on cobalt or tungsten. In one example, the second layer is coupled adjacent to the first layer through at least one via hole. In addition, the circuit may be optimized in terms of performance, power, and area (PPA).

The disclosed circuits for EUV technology are compatible with other types of circuits for EUV technology. The disclosed circuit may use one-dimensional (1D) shapes on the second layer (e.g., the interface layer or CM layer). In one example, the second layer may be a local interconnect layer. Also, the disclosed circuit may use two-dimensional (2D) shapes for the first layer (e.g., M1 layer), for example, with copper routing on the M1 layer. That is, the first layer may be a metal routing layer based on copper. In another example, the circuit may use source terminal termination to enable area-efficient abutment and reduced layout effects. Also, the circuit area may be reduced by a contacted poly pitch (CPP), dependent on abutment. The contacted poly pitch is a distance between poly elements in the circuit. In addition, the circuit may use a shared drain for power and performance improvement.

In another example, the circuit may be optimized (e.g., "100% clean" or "100% compliant") for a design rule check (DRC) to a process technology maturity and model. Example simulation results for the circuit model with the disclosed circuits for EUV technology show approximately 3% improvement in dynamic power performance while maintaining similar frequency response and leakage characteristics.

FIG. 1 illustrates an example of a circuit 100 in accordance with the present disclosure. FIG. 1 is presented as a top view of the circuit 100. In the example of FIG. 1, the circuit 100 is configured as a NAND gate cell. Although FIG. 1 shows a NAND gate cell, one skilled in the art would understand that other logical gates such as NOR, XOR, AND, OR, etc. may be configured using the circuit 100 within the scope and spirit of the present disclosure. As illustrated in FIG. 1, the circuit 100 includes the following: M1 power rail: VDD; NMOS (NMOS transistor(s)) with source and drain.

In the circuit 100 shown in FIG. 1, a 2D shape is used only for a first layer (e.g., a metal layer or M1 layer). In one example, the first layer is a metal routing layer. In one example, the M1 layer is based on copper and uses copper routing. Within the scope and spirit of the present disclosure, other materials may also be used for the first layer. In one example, the first layer may be adjacent to an upper layer (i.e., a layer above). In one example, the first layer may be adjacent to a lower layer (i.e., a layer below).

Accordingly, MOS transistors are metal-oxide semiconductor (MOS) transistors, NMOS transistors are negative-channel metal-oxide semiconductor (NMOS) transistors and PMOS transistors are positive-channel metal-oxide semiconductor (PMOS) transistors. In addition, CMOS transistors are complementary metal-oxide semiconductor (CMOS) transistors. In one example, MOS transistors include at least three terminals: a gate terminal, a source terminal and a drain terminal. In one example, a MOS transistor may be configured such that the gate terminal acts as a high-impedance input terminal and the source terminal or drain terminal acts as an output terminal which responds to a voltage at the input terminal. In one example, responding to a voltage at the input terminal means that an output voltage at the output terminal changes state when the voltage at the input terminal changes state.

In the circuit of FIG. 1, which in one example is a NAND2 circuit (i.e., a two-input NAND gate cell), NMOS transistors share a drain terminal ("shared drain terminal"). In addition, a second layer (e.g., interface layer or CM layer) uses only 1D shapes throughout. In one example, the second layer is a local interconnect layer. The second layer may be based on tungsten or cobalt, in the example of FIG. 1. Although within the scope and spirit of the present disclosure, other materials may be used for the second layer. The second layer is adjacent to the first layer. In one example, the second layer may be adjacent to an upper layer (i.e., a layer above). In one example, the second layer may be adjacent to a lower layer (i.e., a layer below).

Although NMOS transistors are shown in the example of FIG. 1, different types of MOS transistors (i.e., NMOS transistors, PMOS transistors or combinations of NMOS and PMOS transistors, e.g. CMOS transistors) may be used. In one example, a source terminal is terminated ("source terminal termination"), for both NMOS and PMOS transistors. The source terminal termination may reduce circuit area and allow continuous diffusion (RX) paths for less layout effects and/or better matching of silicon to circuit models. For example, continuous diffusion (RX) paths may be utilized in PMOS transistors. In one example, continuous diffusion (RX) paths have no diffusion breaks. For example, continuous diffusion paths employ silicon. In one example, continuous diffusion paths may allow adjacent placement of oxide regions from two circuits.

In another example, the circuit may be used to reduce contacted poly pitch (CPP) and/or improve performance by adding source contacts. For example, an isolation structure, such as shallow trench isolation (STI), may be used for NMOS transistors to isolate electrically portions of the circuits from each other. In one example, STI uses an oxide for implementation.

FIG. 1 shows an example layout of a first layer (e.g., M1 layer) with M1 drain routing, a second layer (e.g., interface layer) with a CM source contact and CM drain contact, a first M1 power rail (VDD), and a second power rail (VSS). Although one example layout is shown in FIG. 1, other layouts may be used in accordance with the present disclosure. In one aspect, the circuit in accordance with the present disclosure may include one or more of the following benefits: a) a reduced area (i.e., reduced footprint); b) lower dynamic current consumption compared to other circuits; and c) a low leakage current for both NAND gate cells and NOR gate cells.

Figure 2:
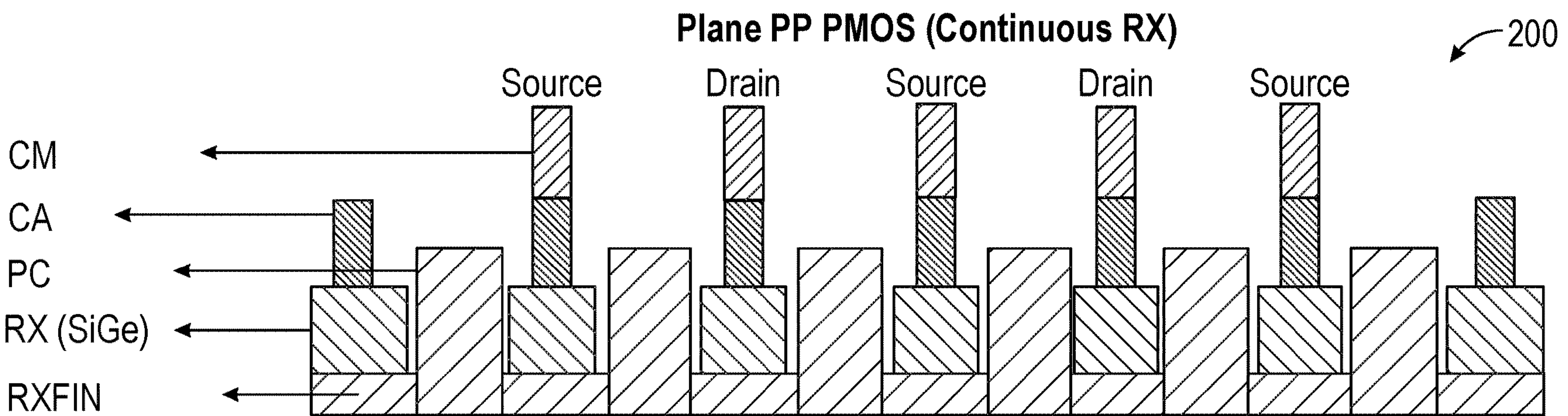
FIG. 2 illustrates an example cross-sectional view of a positive-channel metal-oxide semiconductor (PMOS) transistor.

FIG. 2 illustrates an example cross-sectional view of a positive-channel metal-oxide semiconductor (PMOS) transistor 200. In one example, the PMOS transistor 200 may be a component of a circuit, for example, the circuit 100 shown in FIG. 1. Shown from the top of FIG. 2 are a contact merge (CM) layer, a contact to active (CA) layer, a PC layer, a routing (RX) layer, and a RXFIN layer. In one example, the RXFIN layer is a layer with one or more fins over the active area. In one example, the CM layer is used to connect to other layers (e.g., higher layers). In one example, the CA layer is used as a connection to an active region. In one example, the PC layer is a gate. In one example, the PC layer defines metal gates. In one example, the RX layer defines an active gate silicon area with SiGe grown on top of silicon fins. In one example, the RXFIN layer defines silicon fins.

Figure 3:
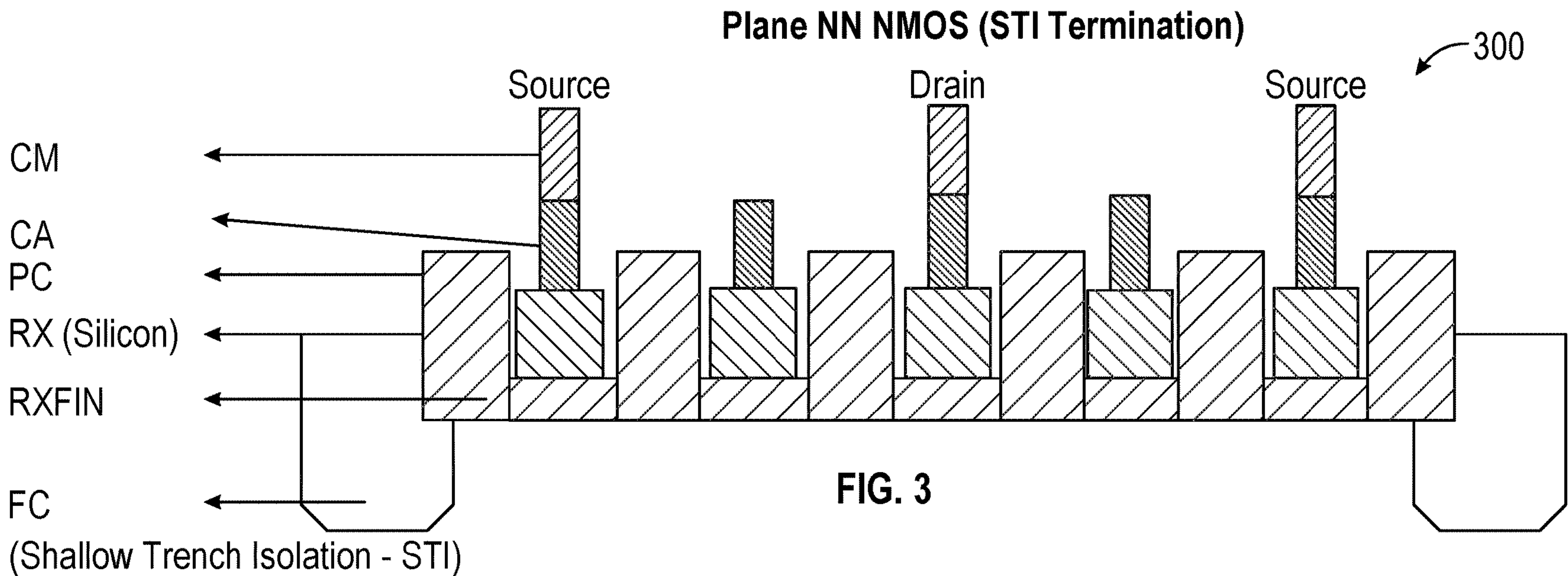
FIG. 3 illustrates an example cross-sectional view of a negative-channel metal-oxide semiconductor (NMOS) transistor.

FIG. 3 illustrates an example cross-sectional view of a negative-channel metal-oxide semiconductor (NMOS) transistor 300. In one example, the NMOS transistor 300 may be a component of a circuit, for example, the circuit 100 shown in FIG. 1. Shown from the top of the figure are a contact merge (CM) layer, a contact to active (CA) layer, a PC layer, a routing (RX) layer, a RXFIN layer and a FC layer. In one example, the FC layer is a layer with fin cut, also known as shallow trench isolation. In one example, the CM layer is used to connect to other layers (e.g., higher layers). In one example, the CA layer is used as a connection to an active region. In one example, the PC layer defines metal gates. In one example, the RX layer defines an active gate silicon area with silicon grown on top of silicon fins. In one example, the RXFIN layer defines silicon fins. In one example, the FC layer defines a shallow trench isolation (STI) layer.

Figure 4:
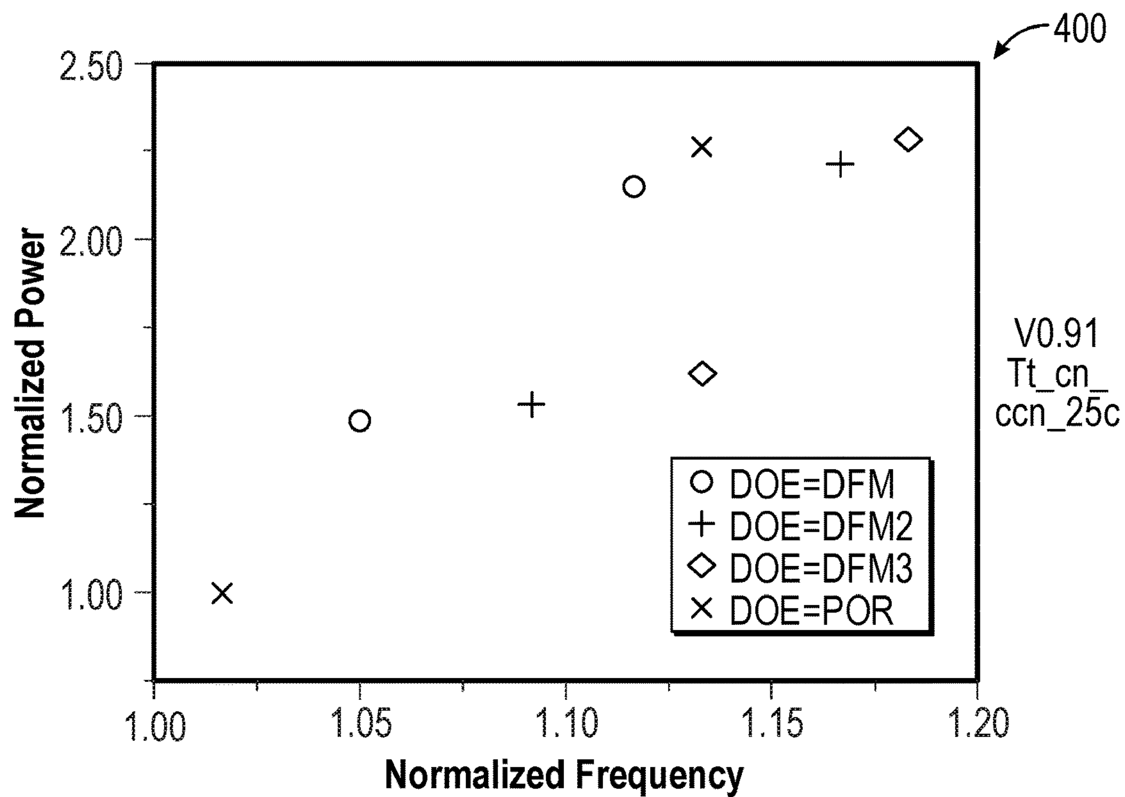
FIG. 4 illustrates an example of a normalized performance curve for a two-input NAND (NAND2) circuit as part of a ring oscillator (RO) circuit.

FIG. 4 illustrates an example of a normalized performance curve 400 for a two-input NAND (NAND2) circuit as part of a ring oscillator (RO) circuit. For example, performance of a circuit may be assessed by comparing the normalized power of different circuit designs at a given normalized frequency. In one example, normalized frequency relates to the speed of a circuit. In one example, normalized power relates to the dc power consumption of a circuit. In one example, a lower normalized power is more favorable than a higher normalized power at a given normalized frequency. The points in FIG. 4 labeled with "x - - - DOE=POR" refer to a point of reference (POR design) circuit design, i.e., a prior art circuit design. The points in FIG. 4 labeled with "◇ - - - DOE=DFM3" refer to a design (i.e., DFM3 design) in accordance with the present disclosure. For example, the DFM3 design uses continuous diffusion (RX) paths for PMOS transistors and shallow trench isolation (STI) and source termination for NMOS transistors.

In FIG. 4, for example, the POR design at a normalized frequency of 1.13 has a normalized power of 2.26, and the DFM3 design at the same normalized frequency of 1.13 has a normalized power of 1.62. That is, the DFM3 design consumes about 72% of the power consumed by the POR design at the same normalized frequency. One skilled in the art would understand that the parameters presented in the example of FIG. 4 are just examples and that other values may be used in accordance with the spirit and scope of the present disclosure.

Figure 5:
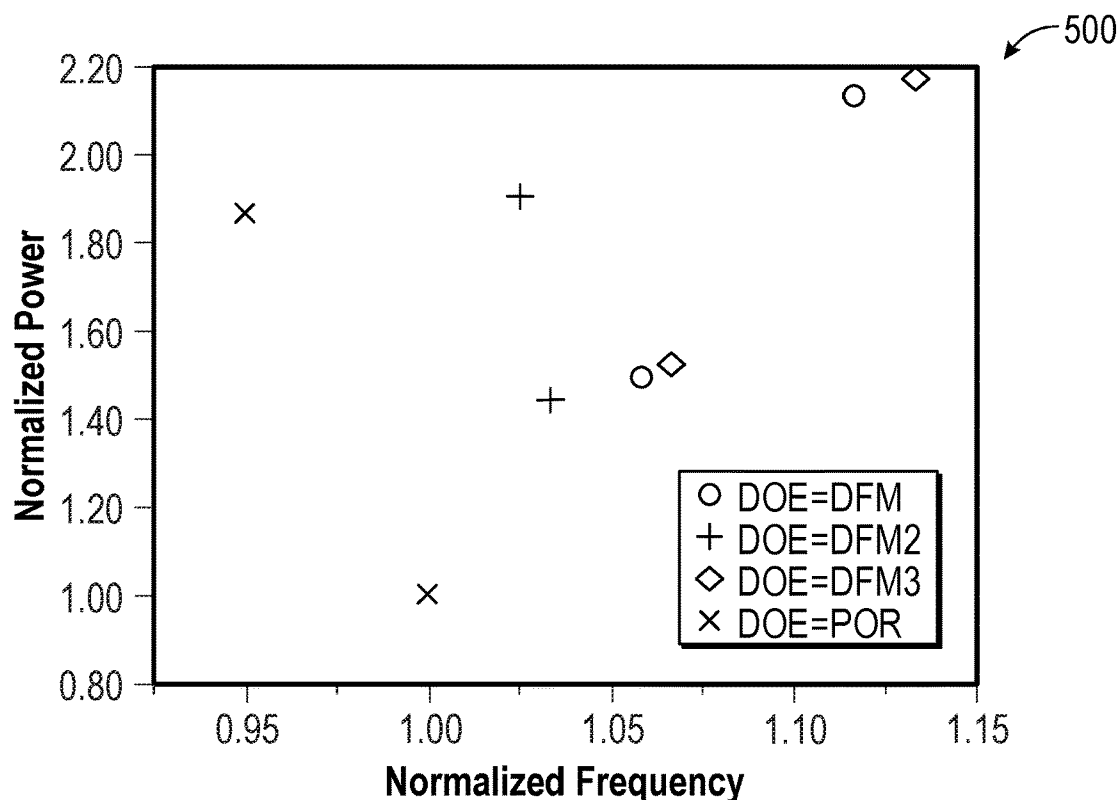
FIG. 5 illustrates an example of a normalized performance curve for a two-input NOR (NOR2) circuit as part of a ring oscillator (RO) circuit.

FIG. 5 illustrates an example of a normalized performance curve 500 for a two-input NOR (NOR2) circuit as part of a ring oscillator (RO) circuit. For example, performance of the circuit may be assessed by comparing the normalized power of different circuit designs at a given normalized frequency. In one example, normalized frequency relates to the speed of a circuit. In one example, normalized power relates to the dc power consumption of a circuit. In one example, a lower normalized power is more favorable than a higher normalized power at a given normalized frequency. The points in FIG. 5 labeled with "x - - - DOE=POR" refer to a point of reference (POR design) circuit design, i.e., a prior art circuit design. The points in FIG. 5 labeled with "◇ - - - DOE=DFM3" refer to a design (i.e., DFM3 design) in accordance with the present disclosure. For example, the DFM3 design uses continuous diffusion (RX) paths for PMOS transistors and shallow trench isolation (STI) and source termination for NMOS transistors.

Figure 6:
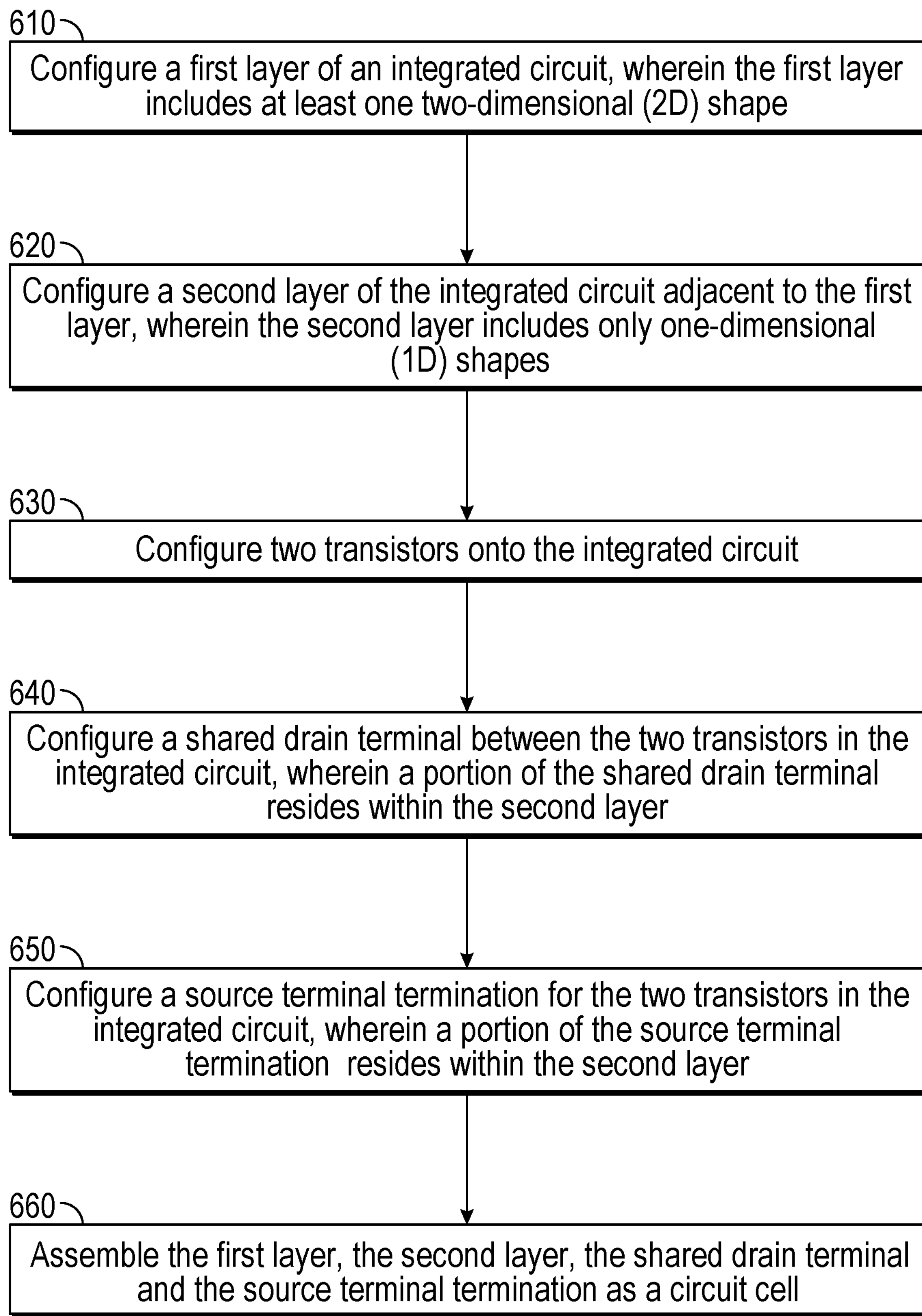
FIG. 6 illustrates a first example flow diagram for configuring an integrated circuit in accordance with the present disclosure.

FIG. 6 illustrates a first example flow diagram 600 for configuring an integrated circuit in accordance with the present disclosure. In block 610, configure a first layer of the integrated circuit, wherein the first layer includes at least one two-dimensional (2D) shape. In one example, the first layer may also include one-dimensional (1D) shape. In one example, the first layer is a metal routing layer. In one example, the metal routing layer is a copper layer. In one example, wherein configuring the first layer is based in part on extreme ultraviolet (EUV) technology.

In block 620, configure a second layer of the integrated circuit adjacent to the first layer, wherein the second layer includes only one-dimensional (1D) shapes. In one example, the second layer is coupled adjacent (e.g., directly adjacent) to the first layer through at least one via hole. In one example, the second layer is an interface layer made of cobalt or tungsten. In one example, the second layer is a local interconnect layer. In one example, wherein configuring the second layer is based in part on extreme ultraviolet (EUV) technology.

In block 630, configure two transistors onto the integrated circuit. In one example, each of the two transistors are metal-oxide semiconductor (MOS) transistors. In one example, at least one of the MOS transistors is a negative-channel metal-oxide semiconductor (NMOS) transistor. In one example, at least one of the MOS transistors is a positive-channel metal-oxide semiconductor (PMOS) transistor.

In block 640, configure a shared drain terminal between the two transistors in the integrated circuit, wherein a portion of the shared drain terminal resides within the second layer. In one example, the two transistors are NMOS transistors. In one example, the two transistors are PMOS transistors.

In block 650, configure a source terminal termination for the two transistors in the integrated circuit, wherein a portion of the source terminal termination resides within the second layer.

In block 660, assemble the first layer, the second layer, the shared drain terminal and the source terminal termination as a circuit. In one example, the circuit is a design for manufacturability (DFM) cell based on extreme ultraviolet (EUV) technology. In one example, the circuit is assembled as one of the following: a NAND gate, a NOR gate, an AND gate or an XOR gate. In one example, the circuit is a two-input NAND gate. In one example, the circuit is a two-input NOR gate.

Figure 7:
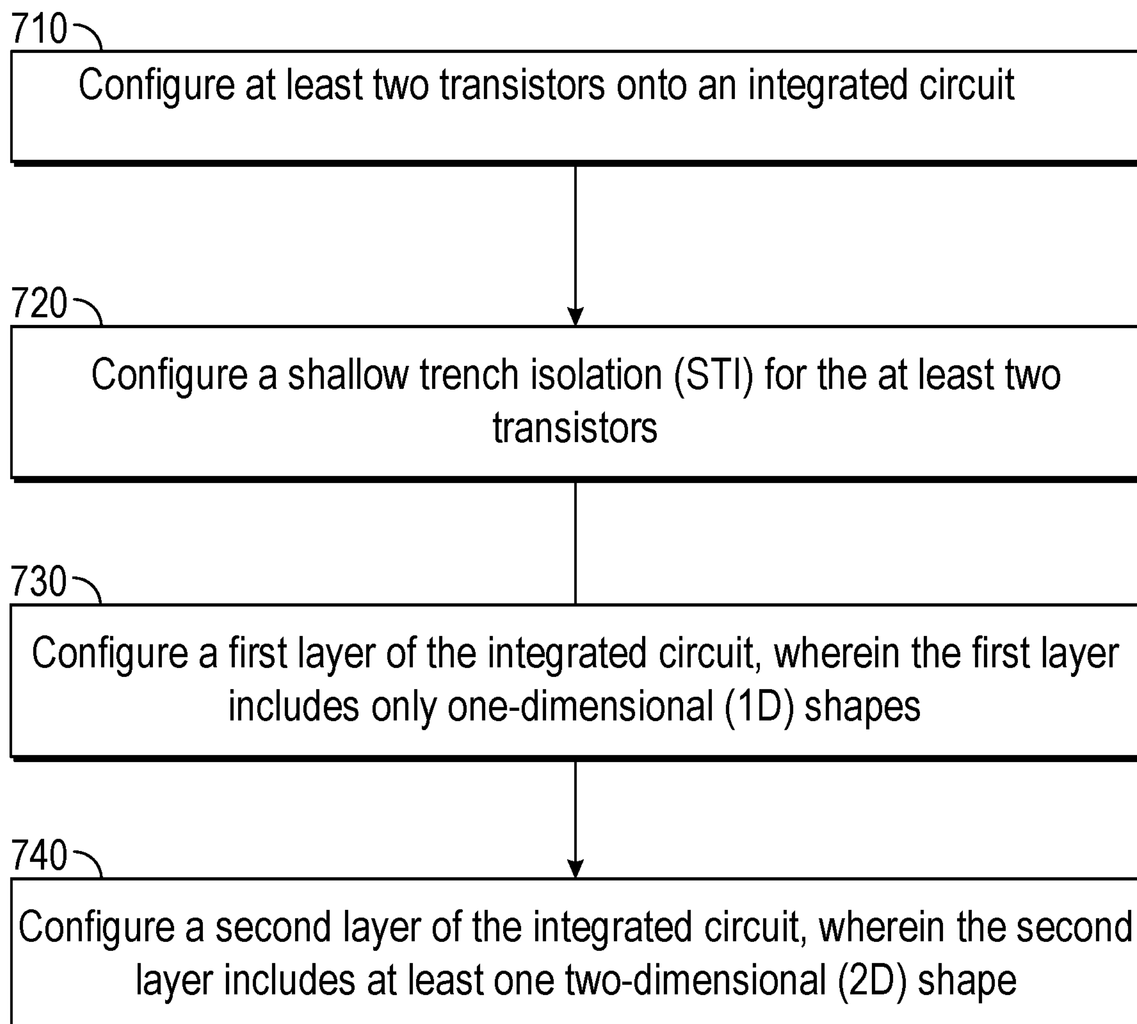
FIG. 7 illustrates a second example flow diagram for configuring an integrated circuit in accordance with the present disclosure.

FIG. 7 illustrates a second example flow diagram 700 for configuring an integrated circuit in accordance with the present disclosure. In block 710, configure at least two transistors onto an integrated circuit. In one example, the at least two transistors are negative channel metal oxide semiconductor (NMOS) transistors. In one example, the at least two transistors are positive channel metal oxide semiconductor (PMOS) transistors. In one example, the at least two transistors include a shared drain terminal. In one example, the at least two transistors include source terminals tied to a power rail. In one example, the at least two transistors are part of a logic circuit, e.g. NAND gate, NOR gate, AND gate, OR gate, XOR gate, etc. In one example, the at least two transistors are part of a storage circuit, e.g. latch, flip flop, memory cell, etc.

In block 720, configure a shallow trench isolation (STI) for the at least two transistors. In one example, the STI is configured only for NMOS transistors. In one example, the STI uses an oxide as part of its implementation.

In block 730, configure a first layer of the integrated circuit, wherein the first layer includes only one-dimensional (1D) shapes. In one example, the 1D shapes are shapes which have a predominant dimensionality in one linear direction. In one example, the first layer may be an interface layer. In one example, the first layer may be a local interconnect layer. In one example, the first layer may be a contact merge (CM) layer. In one example, the first layer may be made of cobalt or tungsten. In one example, the first layer includes the STI. In one example, the first layer includes the shared drain terminal.

In block 740, configure a second layer of the integrated circuit, wherein the second layer includes at least one two-dimensional (2D) shape. In one example, the second layer is a wiring layer. In one example, the second layer is a metal layer. In one example, the second layer is a metal layer made of copper. In one example, the second layer may be an edge layer. In one example, the second layer is coupled to the first layer through at least one via hole.

In one aspect, one or more of the steps in FIGS. 6 and 7 may be executed by one or more processors which may include hardware, software, firmware, etc. In one aspect, one or more of the steps in FIGS. 6 and 7 may be executed by one or more processors which may include hardware, software, firmware, etc. The one or more processors, for example, may be used to execute software or firmware needed to perform the steps in the flow diagrams of FIGS. 6 and 7. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for providing design for manufacturability (DFM) circuits in an integrated circuit. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

In one aspect, one or more of the steps in FIGS. 6 and 7 may be executed by one or more lithographic systems which may include hardware, software, firmware, etc. In one aspect, one or more of the steps in FIGS. 6 and 7 may be executed by one or more lithographic systems which may include hardware, software, firmware, etc. The one or more lithographic systems, for example, may be used to execute software or firmware needed to perform the steps in the flow diagram of FIGS. 6 and 7. For example, the one or more lithographic systems may include ultraviolet lithographic systems, extreme ultraviolet (EUV) lithographic systems, x-ray lithographic systems, electron beam lithographic systems, ion projection lithographic systems, photolithographic systems, etc.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A circuit, comprising:
- a first layer, wherein the first layer includes two-dimensional (2D) shapes;
- a second layer coupled adjacent to the first layer through at least one via hole, wherein the second layer includes only one-dimensional (1D) shapes;
- a shared drain terminal;
- a source terminal termination;
- at least one continuous diffusion path placed between at least two positive channel metal oxide semiconductor (PMOS) transistors on either the first layer or the second layer; and
- a shallow trench isolation (STI) layer adjacent to a negative channel metal oxide semiconductor (NMOS) transistor.

2. The circuit of claim 1, further comprising a plurality of metal oxide semiconductor (MOS) transistors.

3. The circuit of claim 2, wherein at least two of the plurality of MOS transistors are associated with the shared drain terminal.

4. The circuit of claim 2, wherein at least one of the plurality of MOS transistors is associated with the source terminal termination.

5. The circuit of claim 2, wherein the plurality of MOS transistors includes at least two NMOS transistors.

6. The circuit of claim 5, wherein the plurality of MOS transistors includes at least two PMOS transistors.

7. The circuit of claim 2, wherein the plurality of MOS transistors includes at least two PMOS transistors.

8. The circuit of claim 1, wherein the first layer is a metal routing layer.

9. The circuit of claim 8, wherein the metal routing layer is a copper layer.

10. The circuit of claim 9, wherein the second layer is an interface layer made of cobalt or tungsten.

11. The circuit of claim 10, wherein the circuit is one of the following: a NAND gate, a NOR gate, an AND gate, a OR gate or an XOR gate.

12. The circuit of claim 10, wherein the circuit is a two-input NAND gate or a two-input NOR gate.

13. The circuit of claim 9, wherein the second layer is a local interconnect layer.

14. A method for fabricating an integrated circuit, the method comprising:
- configuring a first layer of the integrated circuit, wherein the first layer includes at least one two-dimensional (2D) shape;
- configuring a second layer of the integrated circuit adjacent to the first layer, wherein the second layer includes only one-dimensional (1D) shapes;
- configuring a shared drain terminal between two transistors in the integrated circuit, wherein a portion of the shared drain terminal resides within the second layer;
- configuring at least one continuous diffusion path placed between at least two positive channel metal oxide semiconductor (PMOS) transistors on either the first layer or the second layer; and
- configuring a shallow trench isolation (STI) layer adjacent to a negative channel metal oxide semiconductor (NMOS) transistor.

15. The method of claim 14, further comprising configuring a source terminal termination for the two transistors in the integrated circuit, wherein a portion of the source terminal termination resides within the second layer.

16. The method of claim 15, further comprising configuring the two transistors onto the integrated circuit.

17. The method of claim 15, wherein the first layer comprises at least one one-dimensional (1D) shape.

18. The method of claim 15, wherein the first layer is a metal routing layer.

19. The method of claim 18, wherein the metal routing layer is a copper layer.

20. The method of claim 15, wherein configuring the first layer is based in part on extreme ultraviolet (EUV) technology.

21. The method of claim 15, wherein the second layer is coupled adjacent to the first layer through at least one via hole.

22. The method of claim 15, wherein the second layer is an interface layer made of cobalt or tungsten.

23. The method of claim 22, wherein configuring the second layer is based in part on extreme ultraviolet (EUV) technology.

24. A method for fabricating an integrated circuit, the method comprising:
- configuring at least two negative channel metal oxide semiconductor (NMOS) transistors onto the integrated circuit;
- configuring a shallow trench isolation (STI) adjacent to the at least two NMOS transistors;
- configuring a first layer of the integrated circuit, wherein the first layer includes only one-dimensional (1D) shapes;
- configuring a second layer of the integrated circuit, wherein the second layer includes at least one two-dimensional (2D) shape; and configuring at least one continuous diffusion path placed between at least two positive channel metal oxide semiconductor (PMOS) transistors on either the first layer or the second layer.

25. The method of claim 24, wherein the first layer is adjacent to the second layer.

26. The method of claim 25, wherein the first layer is a contact merge (CM) layer made of cobalt or tungsten.

27. The method of claim 26, wherein the second layer is a metal layer made of copper.

28. The method of claim 27, wherein the at least two negative channel metal oxide semiconductor (NMOS) transistors include a shared drain terminal or the at least two positive channel metal oxide semiconductor (PMOS) transistors include a shared drain terminal.

* * * * *